(12) United States Patent
Kuyel

(10) Patent No.: US 12,298,910 B2
(45) Date of Patent: May 13, 2025

(54) SYSTEM AND METHOD FOR SEARCHING FOR PAGES BASED ON B+ TREE STRUCTURE

(71) Applicant: SK hynix Inc., Gyeonggi-do (KR)

(72) Inventor: Andrey Kuyel, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 102 days.

(21) Appl. No.: 18/300,024

(22) Filed: Apr. 13, 2023

(65) Prior Publication Data

US 2024/0345961 A1    Oct. 17, 2024

(51) Int. Cl.
*G06F 12/00* (2006.01)
*G06F 12/0882* (2016.01)
*G06F 12/0893* (2016.01)
*G06F 16/22* (2019.01)

(52) U.S. Cl.
CPC ...... *G06F 12/0882* (2013.01); *G06F 12/0893* (2013.01); *G06F 16/2246* (2019.01); *G06F 2212/608* (2013.01)

(58) Field of Classification Search
CPC ........... G06F 12/0893; G06F 2212/608; G06F 16/2246
See application file for complete search history.

(56) References Cited

U.S. PATENT DOCUMENTS

| | | | |
|---|---|---|---|
| 8,412,881 B2 | 4/2013 | Boyle | |
| 2010/0306222 A1* | 12/2010 | Freedman | G06F 16/9014 707/769 |
| 2011/0153979 A1* | 6/2011 | Boyle | G06F 12/0246 711/E12.078 |
| 2017/0123665 A1* | 5/2017 | Jannen | G06F 3/0676 |
| 2021/0406237 A1* | 12/2021 | Killamsetti | G06F 16/2246 |
| 2023/0259454 A1* | 8/2023 | Colgrove | G06F 3/0608 711/206 |
| 2024/0111810 A1* | 4/2024 | Shang | G06F 16/9027 |

* cited by examiner

Primary Examiner — John A Lane
(74) Attorney, Agent, or Firm — IP & T GROUP LLP

(57) ABSTRACT

A system for searching for pages of a memory device based on a B+ tree node structure. The system includes a memory device and a controller including a cache memory and a search accelerator. The search accelerator receives a key-value pair associated with a target page among a plurality of pages; and searches for the target page from the cache memory based on the key-value pair, using a tree structure including B+ tree nodes mapped to the plurality of pages. The key-value pair includes a searched key and a value indicating a pointer to a tree node mapped to the target page, among the B+ tree nodes.

19 Claims, 13 Drawing Sheets

SYSTEM AND METHOD FOR SEARCHING FOR PAGES BASED ON B+ TREE STRUCTURE

BACKGROUND

1. Field

Embodiments of the present disclosure relate to a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having a memory device(s), that is, a data storage device(s). The data storage device is used as a main memory device or an auxiliary memory device of the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs). Memory systems may search for pages of memory devices using various schemes.

SUMMARY

Aspects of the present invention include a system for searching for pages of a memory device based on a B+ tree node structure and a method thereof.

In one aspect of the present invention, a memory system includes a memory device including a plurality of pages; and a controller coupled to the memory device and including: a cache memory; and a search accelerator. The search accelerator is configured to: receive a key-value pair associated with a target page among the among a plurality of pages; and search for the target page from the cache memory based on the key-value pair, using a tree structure including B+ tree nodes mapped to the plurality of pages. The key-value pair includes a searched key and a value indicating a pointer to a tree node mapped to the target page, among the B+ tree nodes.

In another aspect of the present invention, a method for operating a memory system including a memory device including a plurality of pages, and a controller including a cache memory includes: receiving a key-value pair associated with a target page among the plurality of pages; and searching for the target page from the cache memory based on the key-value pair, using a tree structure including B+ tree nodes mapped to the plurality of pages. The key-value pair includes a searched key and a value indicating a pointer to a tree node mapped to the target page, among the B+ tree nodes.

Additional aspects of the present invention will become apparent from the following description.

DETAILED DESCRIPTION

Figure 1:
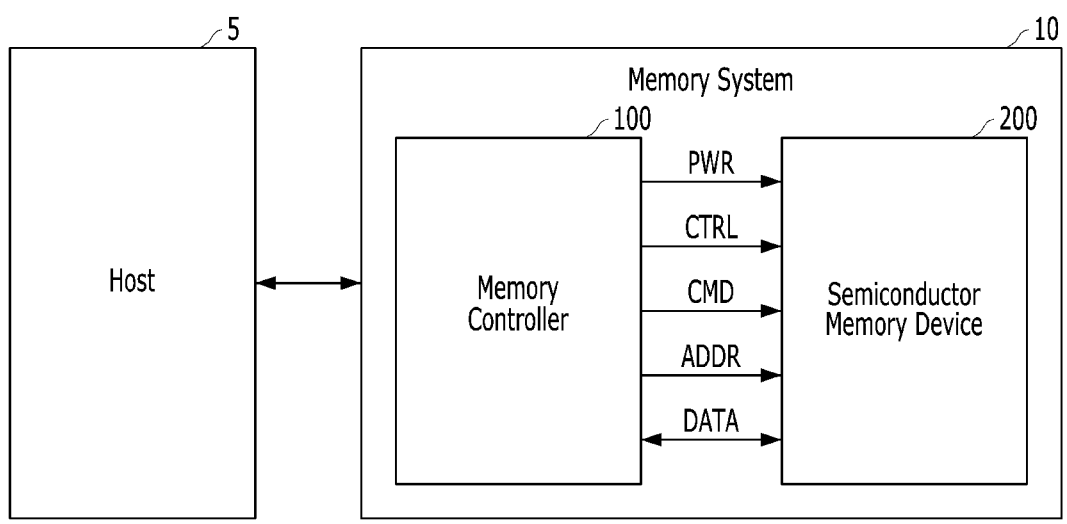
FIG. 1 is a block diagram illustrating a data processing system in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of embodiments of the present invention is provided below along with accompanying figures that illustrate aspects of the present invention. The present invention is described in connection with such embodiments, but the present invention is not limited to any embodiment. The present invention encompasses numerous alternatives, modifications and equivalents to the disclosed embodiments. Numerous specific details are set forth in the following description in order to provide a thorough understanding of the present invention. These details are provided for the purpose of example; the present invention may be practiced without some or all of these specific details. For clarity, technical material that is known in technical fields related to the present invention has not been described in detail so that the present invention is not unnecessarily obscured.

FIG. 1 is a block diagram illustrating a data processing system 2 in accordance with one embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as for example a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include for example a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure for example a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
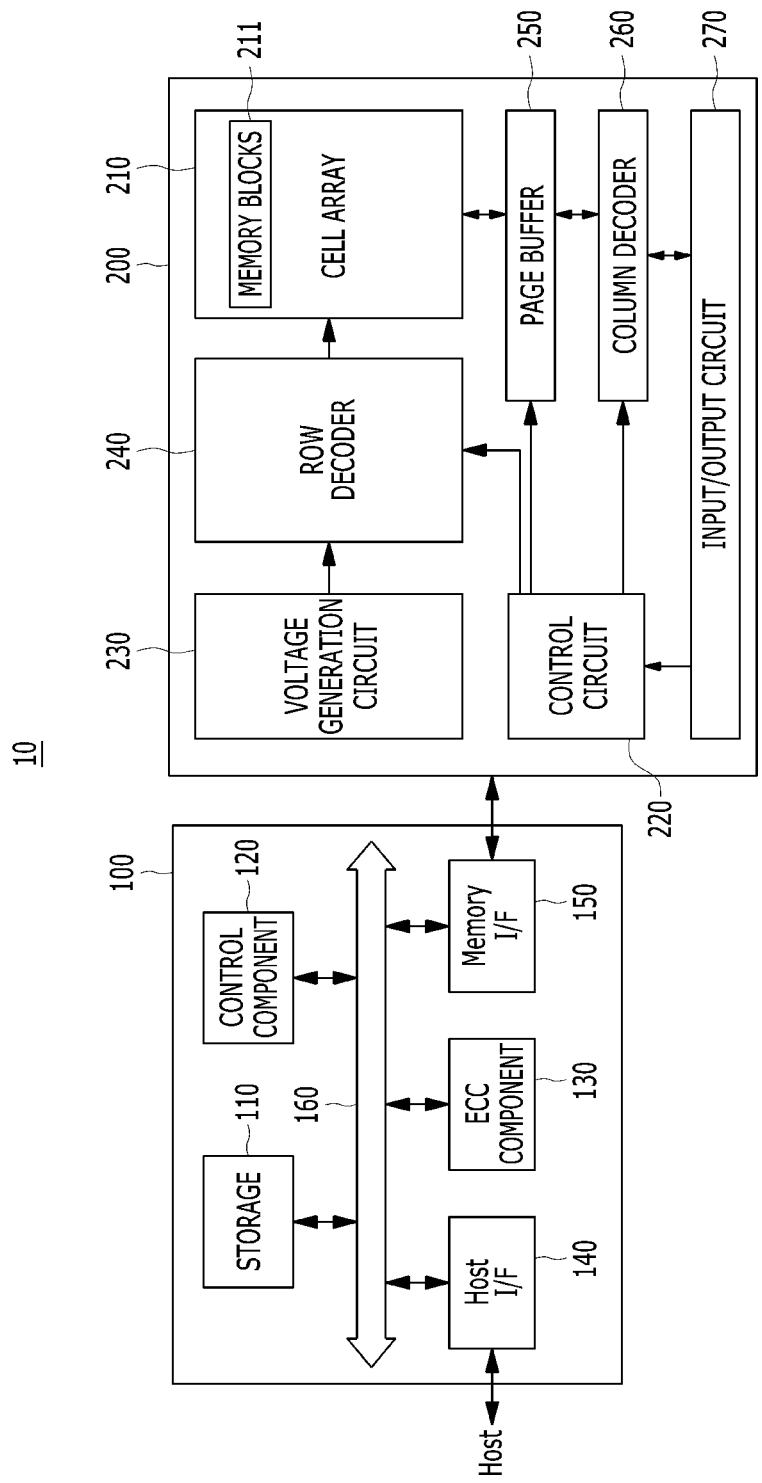
FIG. 2 is a block diagram illustrating a memory system in accordance with another embodiment of the present invention.

FIG. 2 is a block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as for example a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include as shown a storage 110, a control component 120 which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and may store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various communication standards or interfaces such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
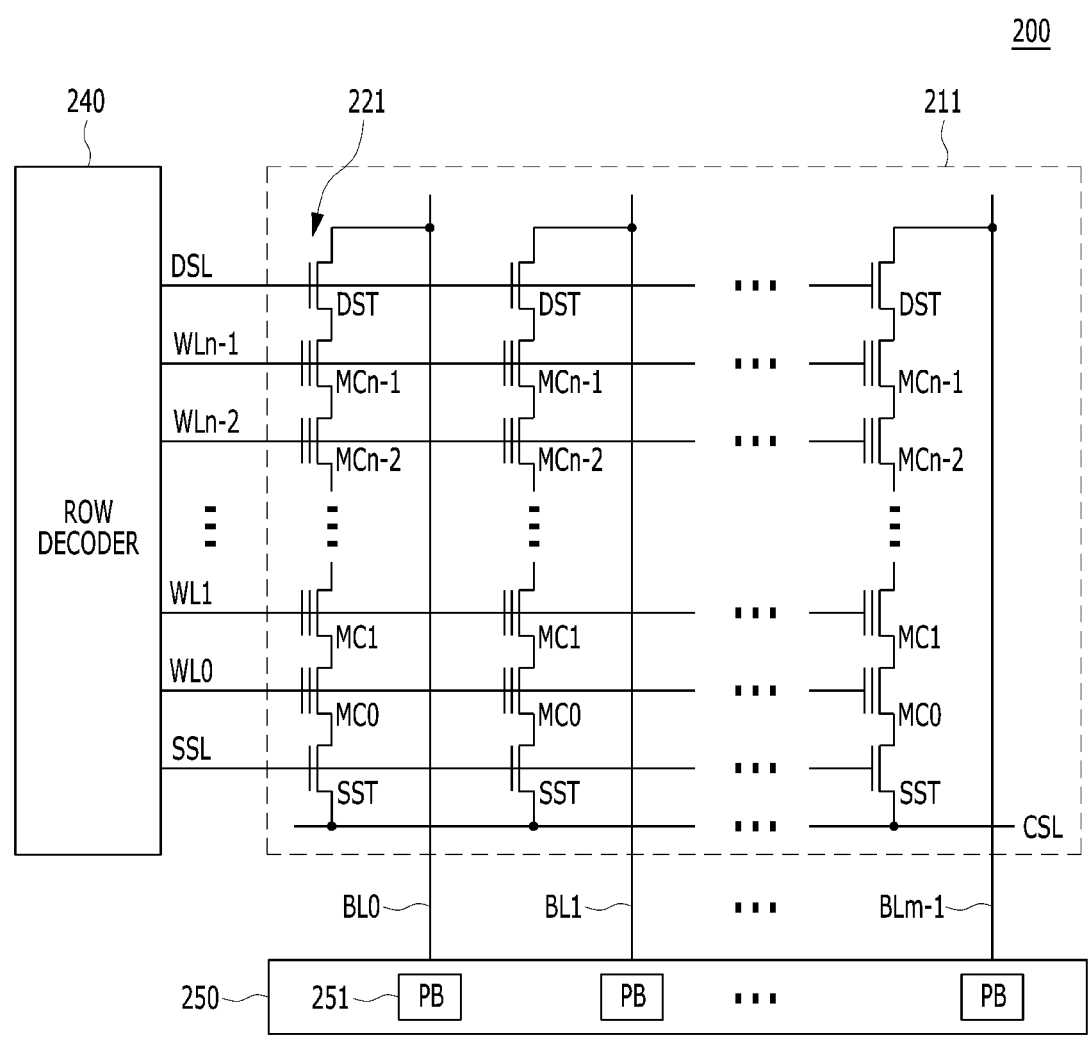
FIG. 3 is a circuit diagram illustrating a memory block of a memory device in accordance with still another embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, each memory block of FIG. 3 may be any of the memory blocks 211 of the memory cell array 210 shown in FIG. 2.

Referring to FIG. 3, the memory block 211 may include a plurality of word lines WL0 to WLn−1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
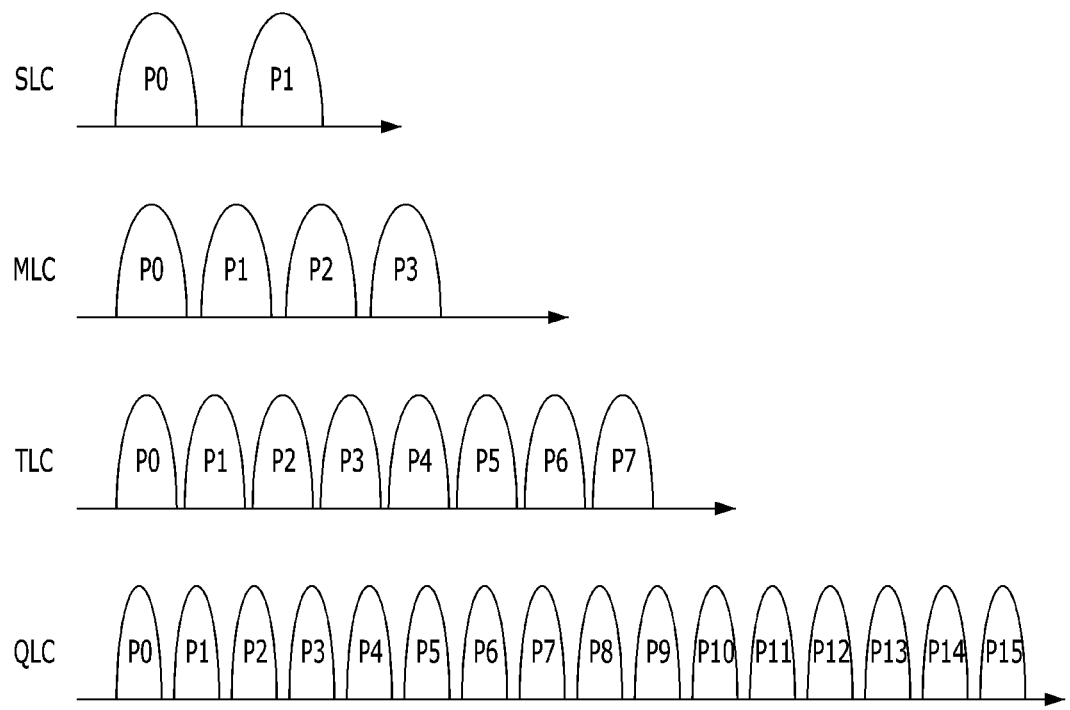
FIG. 4 is a diagram illustrating distributions of states for different types of cells of a memory device in accordance with yet another embodiment of the present invention.

FIG. 4 is a diagram illustrating distributions of states or program voltage (PV) levels for different types of cells of a memory device in accordance with an embodiment of the present invention.

Referring to FIG. 4, each of the memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as SSD.

Figure 5:
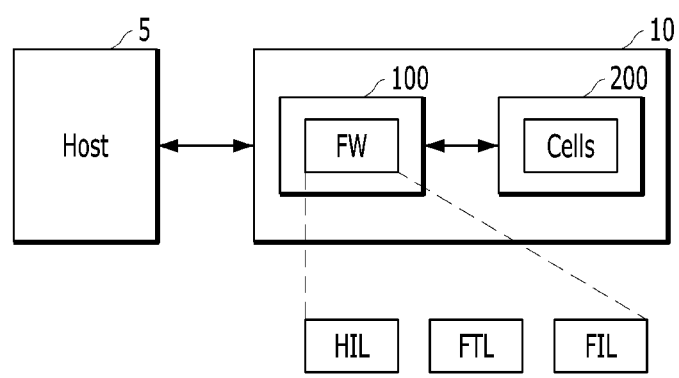
FIG. 5 is a diagram illustrating a data processing system in accordance with one embodiment of the present invention.

FIG. 5 is a diagram illustrating a data processing system 2 in accordance with another embodiment of the present invention.

Referring to FIG. 5, the data processing system 2 may include a host 5 and a memory system (i.e., a storage device) 10. The storage device 10 may include a controller 100 and a memory device 200. The memory device 200 may include a plurality of memory cells (e.g., NAND flash memory cells). The memory cells are arranged in an array of rows and columns as shown for example in FIG. 3. The cells in a particular row are connected to a word line (e.g., WL0), while the cells in a particular column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line.

The controller 100 may include firmware (FW) which is a specific class of software for controlling various operations (e.g., read, write, and erase operations) for the memory device 200. In some embodiments, the firmware may reside in the storage 110 and may be executed by the control component 120, in FIG. 2.

The firmware may include a host interface layer (HIL) 5 controlling communication with the host 5, a flash translation layer (FTL) controlling communication between the host 5 and the memory device 200, and a flash interface layer (FIL) controlling communication with the memory device 200. FTL is the most complex part of the firmware.

In some embodiments, the data processing system 2 may be implemented with NAND flash-based storage. The NAND flash-based storage may be used in embedded systems as a means to store data and information, providing the system with the needed instructions to operate.

NAND flash-based storages are widely used in embedded systems due to its numerous benefits: low cost, high density, small form factor and so on. Embedded systems have very low margins in terms of computation or hardware resources such as CPU time (e.g., processing time of the control component 120 of the controller 100 in FIG. 2), storage (e.g., RAM) size (e.g., size of the storage 110 of the controller 100), power (e.g., power of the control component 120 or the controller 100), etc. The storage 110 of the controller 100 in FIG. 2 (e.g., SSD controller's RAM) typically holds firmware data and information on mapping of logical blocks to their physical locations of the memory device 20. The size of logical to physical translation tables associated with the mapping information may be larger than available RAM recourses. When data required for SSD controller's operation partially fits into the controller's RAM, advanced memory caching and memory swap techniques may be applied to improve data availability in embedded systems. Besides, in the latest versions of non-volatile memory, host interface protocols support a host system memory reservation feature. This feature enables host system memory reservation exclusively for SSD controllers' needs and reduces SSD controllers' memory shortage. Some configurations of SSD storage devices generally operate with a small amount of a system memory (e.g., RAM) and thus cannot fit the whole operational data into the system memory. Therefore, when the physical system memory is exhausted, firmware can utilize memory-swapping techniques to reclaim memory for a new data chunk that will be loaded from a NAND storage or a host system memory cache. Prior to loading the next piece of a data structure into controller's memory, it should be located and fetched into RAM either from a host system memory or from a NAND storage. Some data indexing schemes may be applied to access key values pairs in order to enable a faster data lookup and reduce the number of accesses to an underlying data storage. An improper indexation scheme applied to the block-oriented data may cause an increased number of NAND storage or host system memory cache reads and consequently increased loading time of the next piece of data into controller's RAM.

Accordingly, embodiments provide a system and a method for hardware-accelerated B+ tree indexation and B+ tree keys lookup. B+ tree is efficient in a block-oriented storage media, in particular in NAND storage. Application of B+ trees as a data indexing scheme with dedicated B+ tree hardware search engine provides multifold keys lookup time gain, reducing the time required to locate and load next data chunk into SSD controller's RAM.

Compared to search algorithms binary or linear indexing scheme, a search (find) operation based on a B+ tree with a high branching factor outperforms the former. This is primarily because the B+ tree has a high fan-out (i.e., the number of pointers to child nodes), which, unlike binary search trees, reduces the number of input/output operations required to find an element in the tree. The B+ tree may include a root node and multiple lower-level nodes, which are coupled through branches. In some embodiments, a B+ tree data structure may include keys and node pointers mapped to NAND pages organized according to a layout format and have a branching factor in interval from 50 to 256 (that is having a range of branches from 50 to 256). The B+ tree data structure guarantees performance-optimized NAND I/O and host memory I/O utilization. Furthermore, key lookup operations in the B+ tree are speeded up by means of application of an embedded reconfigurable SSD hardware accelerator to perform a search operation by a specified key. The mapping of B+ tree nodes into a NAND page and a key search operation using a B+ tree search hardware accelerator reduce the number of input/output operations to an underlying NAND storage and volatile memory. In some embodiments, a cache manager may be integrated into the B+ tree search hardware accelerator. The cache manager may be configured to maximize the number of B+ tree NAND pages with lower-level B+ tree nodes that are held in SSD controller's RAM or host memory. Unlike NAND read access latency, keeping of lower-level B+ tree nodes in low latency access memories may reduce the number of NAND I/O operations required for B+ tree traversal. Since the key search operation starts from the root node of the B+ tree, maximization of lower-level nodes maintained in the fast memory is beneficial for consequent key search in the same B+ tree.

Embodiments for retrieval of key value pairs improve lookup time independently of B+ tree indexing data structures storage media, offloads SSD controller's CPU resources, and speeds up the entire data retrieving process.

Figure 6A:
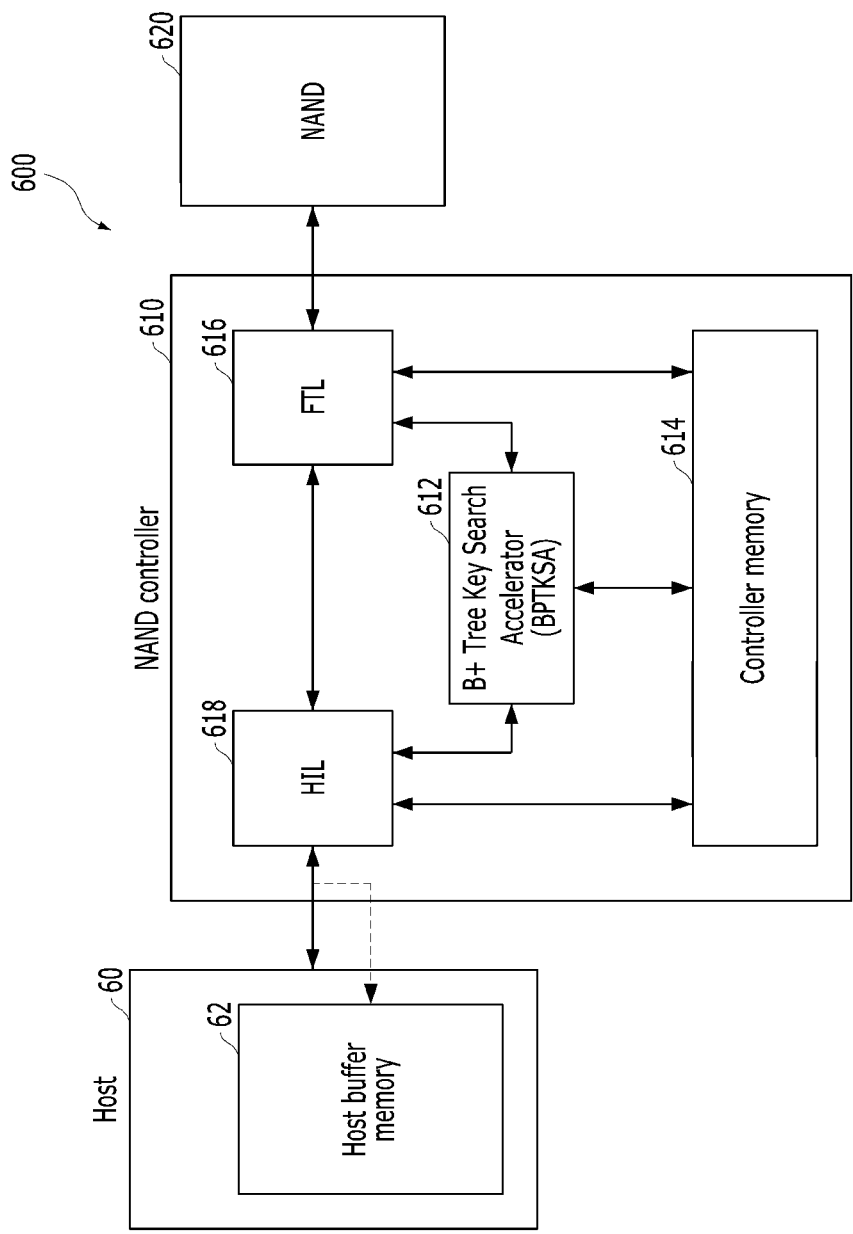
FIGS. 6A and 6B is a diagram illustrating a memory system for searching for pages based on a B+ tree node structure in accordance with another embodiment of the present invention.
Figure 6B:
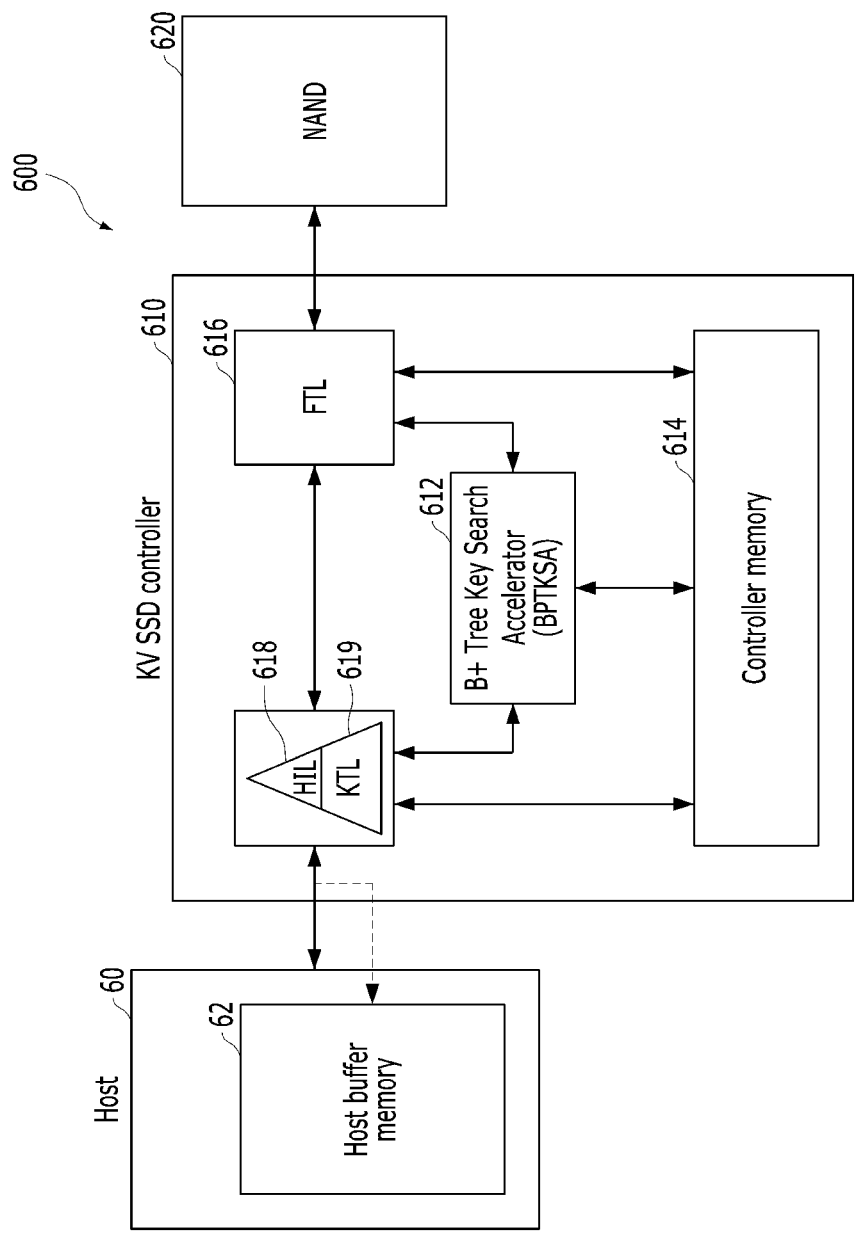

FIGS. 6A and 6B is a diagram illustrating a memory system 600 for searching for pages based on a B+ tree node structure in accordance with an embodiment of the present invention.

Referring to FIGS. 6A and 6B, the memory system 600 may be coupled to a host 60, and may include a controller (e.g., NAND controller) 610 and a memory device (NAND flash memory device) 620. The host 60, the controller 610 and the memory device 620 may correspond to the host 5, the memory controller 100 and the memory device 200 of FIGS. 1, 2 and 5, respectively. The host 60 may include a host buffer memory 62. The controller 610 may include a B+ tree key search accelerator (BPTKSA) 612, a controller memory 614, a host interface layer (HIL) 618 and a flash translation layer (FTL) 616. BPTKSA 612 may be coupled to the controller memory 614, HIL 618 and FTL 616. The controller memory 614 may be coupled to BPTKSA 612, HIL 618 and FTL 616. HIL 618 may be coupled to the host 60. FTL 616 may be coupled to the memory device 620.

Further, the controller 610 may include a key translation layer (KTL) 619 as shown in FIG. 6B. KTL 619 may receive a key-value pair from the host 60 and control BPTKSA 612 to traverse B+ tree nodes, locate the searched key, and search for a target page among a plurality of pages, based on the key-value pair.

In the illustrated embodiment of FIGS. 6A and 6B, BPTKSA 612 is integrated into a data path of the NAND controller 610. BPTKSA 612 is coupled with the NAND memory device (storage) 620 via FTL 616 and with the host buffer memory 62 of the host 60 via HIL 618. BPTKSA 612 coupling with the NAND storage 620 and the host buffer memory 62 enable fetching B+ tree node pages from the NAND storage 620 or the host buffer memory 62, respectively.

Figure 7:
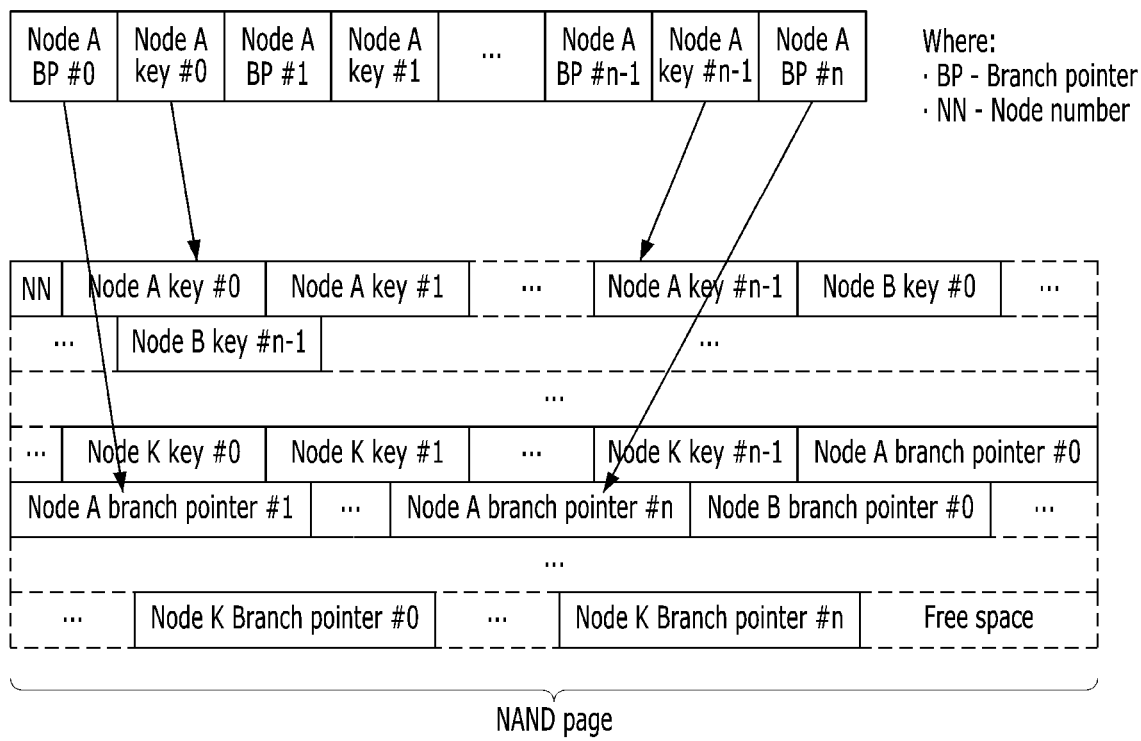
FIG. 7 is a diagram illustrating mapping of B+ tree nodes into a page of a memory device in accordance with still another embodiment of the present invention.

FIG. 7 is a diagram illustrating mapping of B+ tree nodes into a page of a memory device in accordance with another embodiment of the present invention. In this embodiment, a B+ tree node layout within a NAND page is depicted in FIG. 7.

Referring to FIG. 7, for optimization of NAND I/O and volatile memory I/O operations, B+ tree nodes records are organized into specialized data structures that are mapped into NAND pages. In FIG. 7, BP represents a branch pointer and NN represents a node number. In some embodiments, B+ tree nodes may be mapped into a plurality of NAND pages, and multiple tree nodes among B+ tree nodes may be mapped into and aligned with one page among the plurality of NAND pages. In the illustrated embodiment of FIG. 7, K nodes (e.g., node A to node K) are aligned with single page, and each node has n keys (e.g., Key #0 to Key #n−1) and (n+1) branches (e.g., BP #0 to BP #n).

B+ tree nodes alignment with NAND pages guarantees that no B+ tree nodes are partially mapped into different NAND pages. The alignment of B+ tree nodes with a single page enables the access to all node key's/pointer's fields and eliminates the need for reading multiple NAND pages in order to reconstruct single B+ tree node. In some embodiments, nodes keys are mapped into a first region of a page, and branch pointers are mapped into a second region of the page. Sequential mapping of B+ tree nodes keys into the first region of the page, and sequential mapping of node pointers into the second region of the page guarantee optimized RAM access by BPTKSA 612 required to locate a branch pointer.

To process single B+ tree node, one NAND page is read either into the controller memory 614 or the host buffer memory 62.

Figure 8:
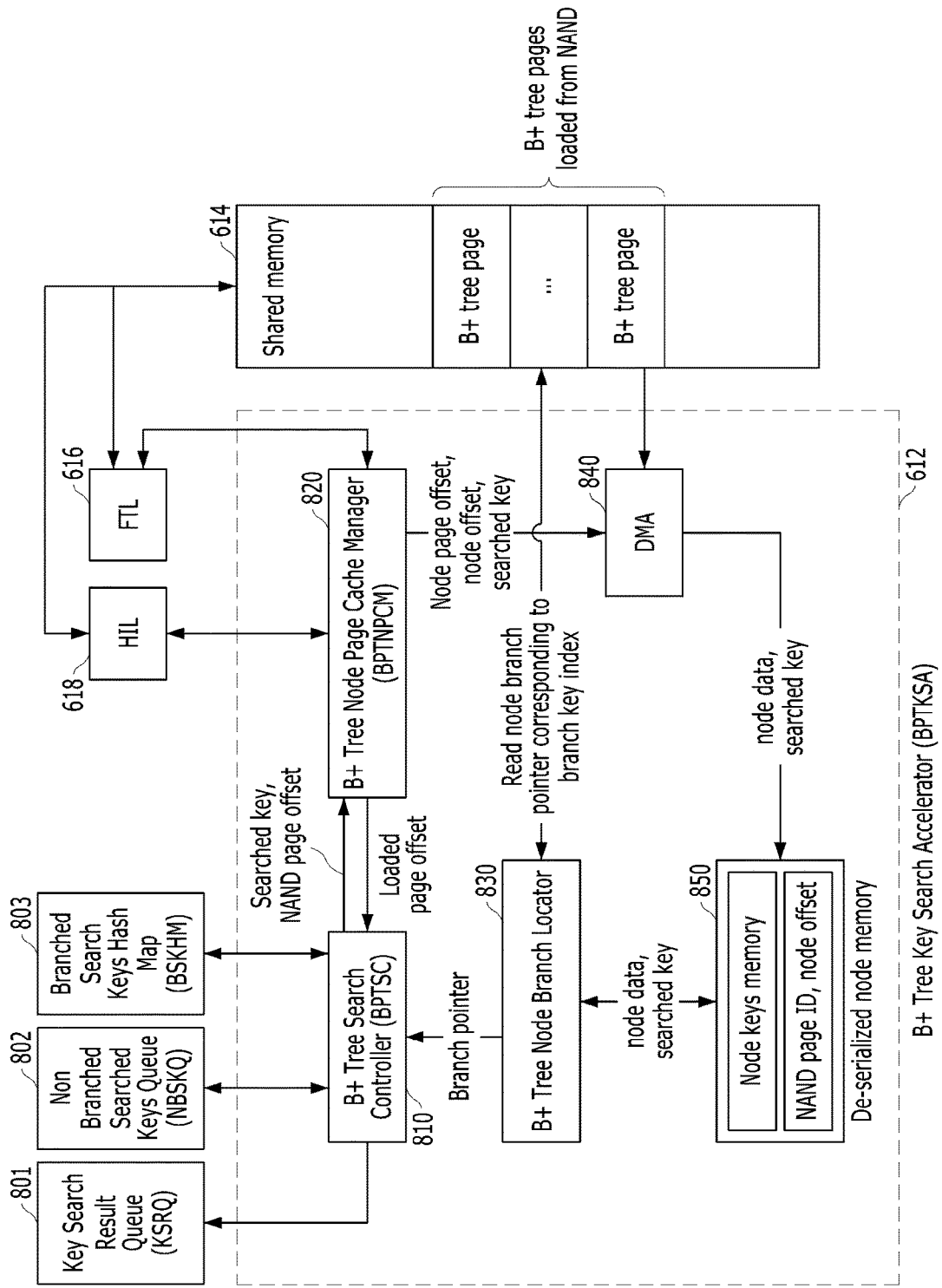
FIG. 8 is a diagram illustrating a B+ tree key search accelerator in accordance with yet another embodiment of the present invention.

FIG. 8 is a diagram illustrating a B+ tree key search accelerator (BPTKSA) 612 in accordance with another embodiment of the present invention.

Referring to FIG. 8, BPTKSA 612 may be coupled to the controller memory 614, FTL 616 and HIL 618. Queues 801 to 803 may be coupled to BPTKSA 612. These components may be integrated into a data path of the NAND controller 610, which enables data fetching and data processing from the memory device 620 and the host buffer memory 62.

BPTKSA 612 may include a B+ tree search controller (BPTSC) 810, a B+ tree node page cache manager (BPTNPCM) 820, a B+ tree node branch locator 830, a direct memory access (DMA) 840 and a de-serialized node memory (850). BPTSC 810 coordinates B+ tree traversal and key search operation. 801 represents a Keys Search Result Queue (KSRQ), 802 represents a Non-Branched Searched Keys Queue (NBSKQ), and 803 represents a Branched Search Keys Hash Map (BSKHM). Queues 801 to 803 may be coupled to the BPTSC 810.

Key-value pairs reside in these queues 801 to 803, where the key is the searched key and the value is the pointer to the next searched B+ tree node. In some embodiments, B+ tree node pointer includes NAND page identification (ID) and B+ tree node offset within the page. The searched key and B+ tree root node pairs are submitted to NBSKQ 802. BSKHM 803 contains searched keys with unfinished B+ tree keys search for them. For these keys, B+ tree branch pointer refers to the next B+ tree node to be searched. KSRQ 801 holds keys and matched NAND page ID containing data corresponding to the searched key.

BPTSC 810 dequeues the searched key and the B+ tree root pointer NAND page ID pair from NBSKQ 802. BPTSC 810 passes the searched key in conjunction with NAND page ID to BPTNPCM 820. BPTNPCM 820 tracks NAND pages fetched from NAND 620 into the controller memory 614 or the host buffer memory 62. Since the access to the controller memory (e.g., RAM) 614 and the host buffer memory 62 is faster than the access to NAND 620, BPTNPCM 820 is configured to maintain NAND pages with lower-level B+ tree nodes and with the highest access rate in the controller memory 614 and the host buffer memory 62 (as shown in FIG. 6B). If the requested NAND page is not in the controller memory 614, BPTNPCM 820 requests HIL 618 to fetch the NAND page from the host buffer memory 62 to the controller memory 614 or instructs FTL 616 to read a corresponding page from NAND 620 to the controller memory 614.

Upon the arrival of the requested NAND page to the controller memory 614, BPTNPCM 820 configures DMA 840 to move corresponding node keys into the de-serialized node memory 850. The de-serialized node memory 850 provides simultaneous access to all memory elements, acting as serial to parallel register. In some embodiments, the capacity of the de-serialized node memory 850 may be defined as Node key width×Node branching factor. De-serialized node keys are passed to the B+ tree node branch locator 830, which in one clock cycle identifies B+ tree node index matched with searched key.

Figure 9:
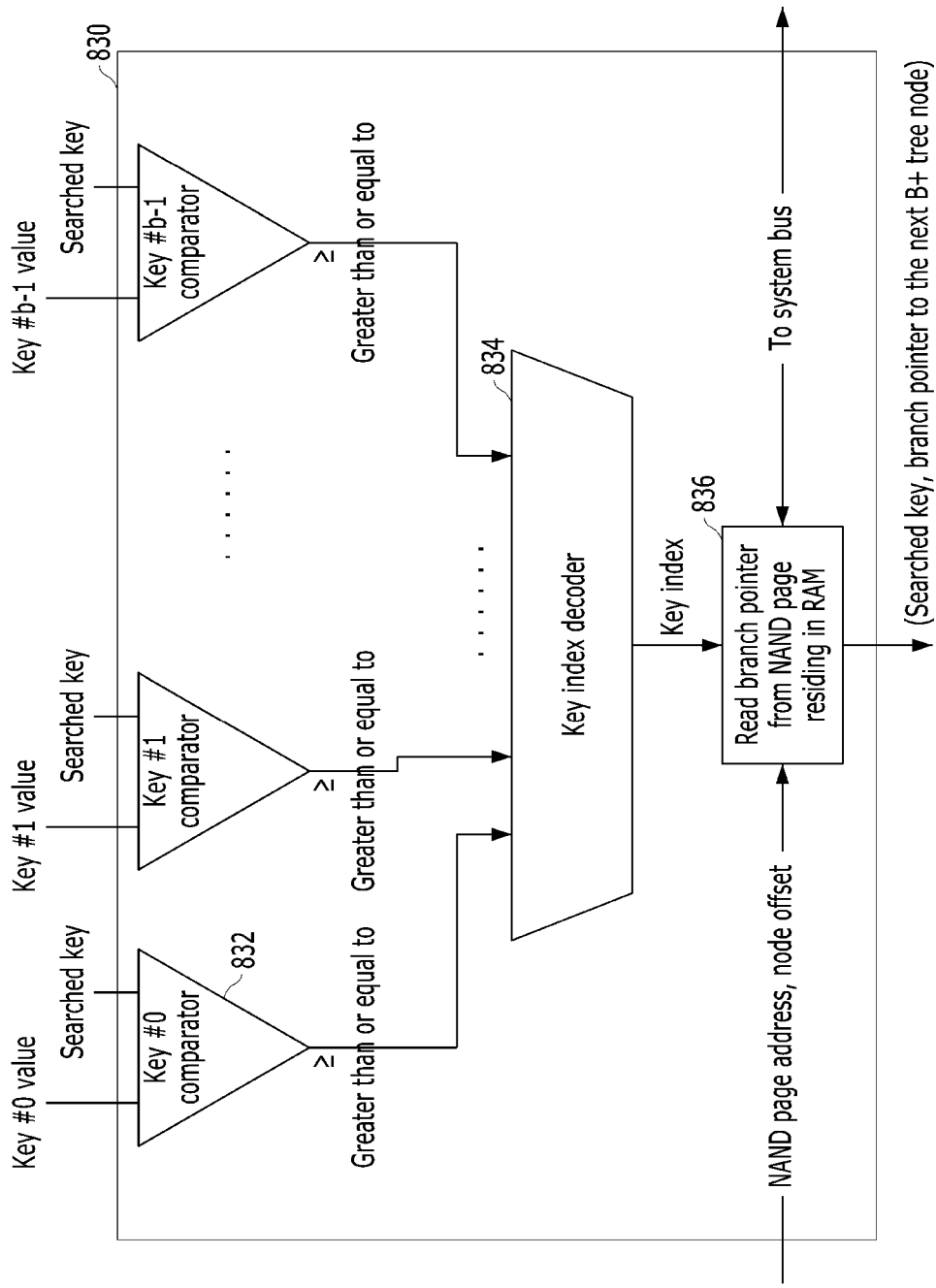
FIG. 9 is a diagram illustrating a B+ tree node branch locator in accordance with one embodiment of the present invention.

FIG. 9 is a diagram illustrating a B+ tree node branch locator 830 in accordance with another embodiment of the present invention.

Referring to FIG. 9, the B+ tree node branch locator (BPTNBL) 830 may perform a branch index location operation. A branch index location operation performed on BPTNBL 830 will take approximately 3 clock cycles. The estimation of BPTNBL 830 in terms of complexity of look-up table (LUT) and flip-flop (FF) is summarized in Table 1. Table 1 represents the field programmable gate array (FPGA) implementation complexity of BPTNBL (e.g., 8 bytes key size). Implementation complexity of BPTNBL is very low if implemented on modern high-end FPGA's. Generally, modern high-end FPGA's contain up to 478K logical cells.

TABLE 1

| B+ Node branching factor | LUT | FF |
| --- | --- | --- |
| 64 | 2282 | 7 |
| 128 | 4676 | 7 |
| 256 | 9539 | 7 |

In contrast, a branch index location operation performed on a general-purpose CPU will take log 2 (Branching factor)× (clock cycle # for memory access+clock cycle # compare operation) clock cycles, which is more than a branch index location operation performed on BPTNBL 830.

BPTNBL 830 may include a plurality of comparators 832, a key index decoder 834 and a key processor 836. In an embodiment, the comparators 832 may include b comparators corresponding to b keys (i.e., #0 to #b−1). Each comparator may compare the searched key with a corresponding key value, and output the comparison result. For example, when a corresponding key value is greater than or equal to the searched key, each comparator may output the corresponding comparison result. The key index decoder 834 may receive and decode comparison results from the comparators 832 to output a corresponding key index. The key processor 836 may receive a key index from the key index decoder 834, read a branch pointer from NAND page residing in the controller memory (e.g., RAM) 614 and output the searched key and the branch pointer to the next B+ tree node.

Referring back to FIG. 8, BPTNBL 830 passes the located branch pointer of the next B+ tree node that is subject to the key search to BPTSC 810, which thereupon puts it into BSKHM 803. Upon loading new B+ tree page into the controller memory 614, BPTNPCM 820 issues a notification to BPTSC 810 about the loaded NAND page ID. BPTSC 810 looks up pages in BSKHM 803 matching them with the NAND page just loaded into the controller memory 614. If NAND pages' IDs in BSKHM 803 are matched with the currently loaded B+ tree NAND page, a corresponding searched key and a NAND page ID pair are extracted from BSKHM 803, and are sent to BPTNPCM 820 as a new search request.

The searched key and B+ tree NAND page ID pair may circulate in the data path of BPTKSA 612 during B+ tree traversal. At the moment of data transition through BPTNBL 830, the searched key is matched with a new NAND page ID, which is subject to the next B+ tree node key lookup. The process is repeated until the searched key has not been found in the B+ tree or until it has not been determined that the searched key is not located in the B+ tree. Finally, KSRQ 801 may be updated with the search result, which is a NAND page ID referencing the data matched with the searched key.

Figure 10A:
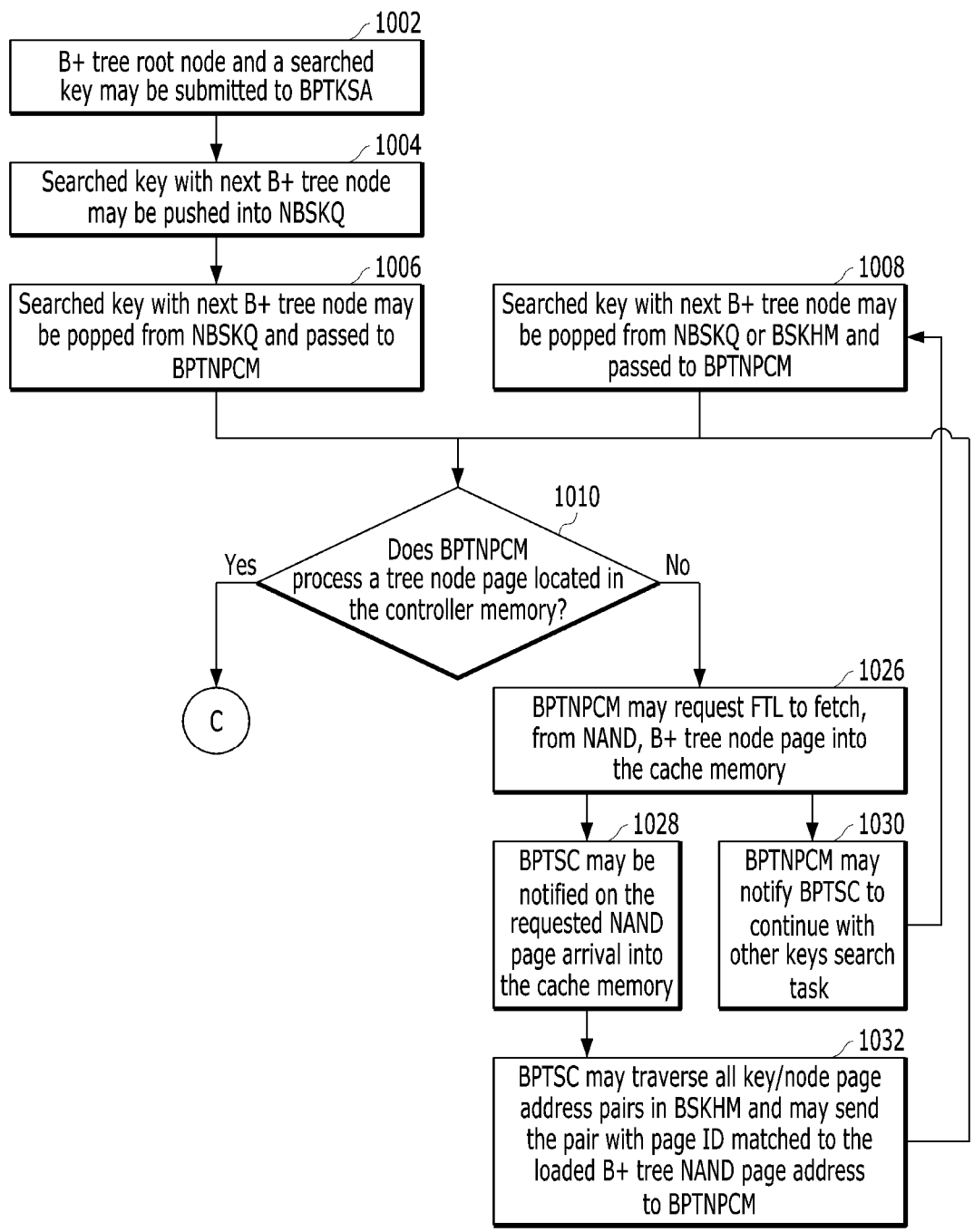
FIGS. 10A and 10B are flowcharts illustrating a B+ tree key search process in accordance with another embodiment of the present invention.
Figure 10B:
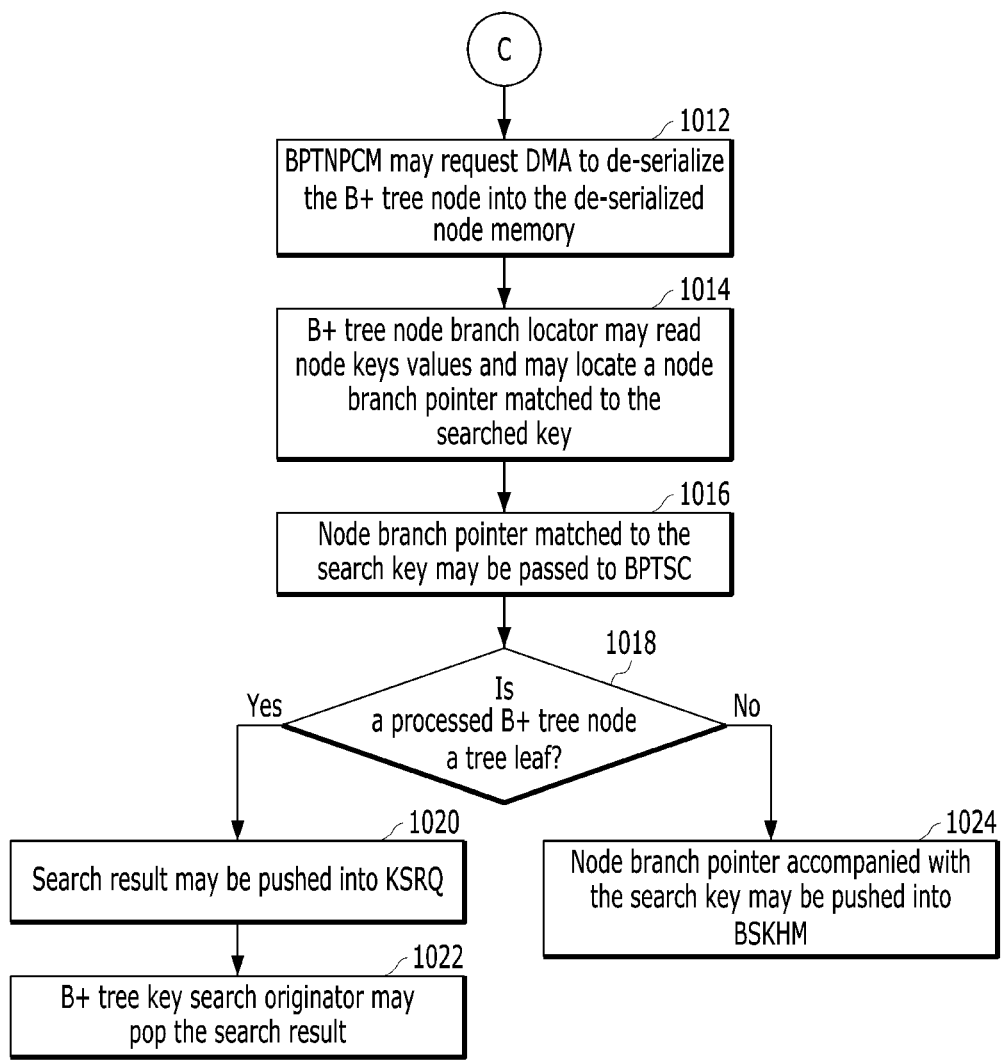

FIGS. 10A and 10B are flowcharts illustrating a B+ tree key search process in accordance with another embodiment of the present invention. This B+ tree key search process may be performed by the B+ tree key search accelerator (BPTKSA) 612.

Referring to FIG. 10A, at operation 1002, a B+ tree root node and a searched key may be submitted to BPTKSA 612. At operation 1004, a searched key with next B+ tree node may be pushed into NBSKQ 802. At operation 1006, the searched key with next B+ tree node may be popped from NBSKQ 802 and passed to BPTNPCM 820. At operation 1008, the searched key with next B+ tree node may be popped from NBSKQ or BSKHM and passed to BPTNPCM 820. At operation 1010, it is determined whether BPTNPCM 820 processed a tree node page located in the controller memory 614 (i.e., a cache or shared memory). If it is determined that BPTNPCM 820 processed the tree node page (1010—Yes), operation 1012 may be performed. If not (1010—No), operation 1026 may be performed.

Referring to FIG. 10B, at operation 1012, BPTNPCM 820 may request DMA 840 to de-serialize the B+ tree node into the de-serialized node memory 850. At operation 1014, the B+ tree node branch locator 830 may read node keys values and may locate a node branch pointer matched to the searched key. At operation 1016, the node branch pointer matched to the search key may be passed to BPTSC 810. At operation 1018, it is determined whether a processed B+ tree node is a tree leaf. If it is determined that the processed B+ tree node is a tree leaf (1018—Yes), operation 1020 may be performed. If not (1018—No), operation 1024 may be performed. At operation 1020, the search result may be pushed into KSRQ 801. At operation 1022, the B+ tree key search originator may pop the search result. At operation 1024, the node branch pointer accompanied with the search key may be pushed into BSKHM 803.

Referring back to FIG. 10A, at operation 1026, BPTNPCM 820 may request FTL 616 to fetch, from NAND 620, B+ tree node page into the cache memory. At operation 1028, BPTSC 810 may be notified on the requested NAND page arrival into the cache memory. At operation 1030, BPTNPCM 820 may notify BPTSC 810 to continue with other keys search task. At operation 1032, BPTSC 810 may traverse all key/node page address pairs in BSKHM 803 and may send the pair with page ID matched to the loaded B+ tree NAND page address to BPTNPCM 820.

As described above, embodiments provide B+ trees as a data indexing scheme with a dedicated B+ tree hardware search engine. Although embodiments may be described with apparatuses and processes shown in FIGS. 6A to 11B, various embodiments may be implemented. In other embodiments, B+ tree update operations may be performed by firmware.

Example

In modern SSD controllers, firmware operates underlying NAND storages utilizing auxiliary metadata containing NAND state information, wear leveling counters values, logical to physical address translation table and etc. Constrained amount of available controller memory (e.g., RAM) leads to a periodical auxiliary metadata swap between RAM and persistent storage media such as NAND storage. A key-value (KV) SSD is a data storage device designed for storing, retrieving, and managing associative arrays and a data structure today more commonly known as a dictionary or a hash table. A KV SSD may have a key (or key-value) translation layer (KTL), which maintains mapping between KV pairs and physical memory blocks of the SSD. Moving of the KV interface into an SSD controller results in a tighter integration with the SSD's flash translation layer, cutting out the overhead of operating a block storage device for key-value storage systems by means of block level interface. Generally, by adding only one key-value translation layer, KV SSDs may show a much lower write amplification and a higher performance compared to software key-value database systems. KV SSD applies indexing schemes to records keys for a faster record retrieval. In case of large datasets, indexing data structure cannot entirely fit into the controller's RAM, and therefore the corresponding part of indexing data structure is periodically preloaded into the controller's RAM for processing. The application of the disclosed embodiments to the KTL of KV SSD may offload computation recourses of a CPU in controllers and speed up the key-value record retrieval from underlying NAND storages.

In one example, a 36 TB KV SSD with a 16 GB internal RAM and a 8 GB host buffer memory may be considered. This SSD may store 32 TB of database records (i.e., record key size is 8 Bytes and record value size is 4 KB). The simplest binary search tree indexing scheme for 32 TB of records requires approximately O(N)×(64 bits+49 bits+49 bits) memory space for indexing data structure storage, where N represents the number of records. 32 TB of records values correspond to $$\frac{32 \text{ TB}}{4 \text{ KB}} = 2^{33}$$

records entries. Substitution of O(N) with $2^{33}$ gives an estimation for indexing data structure size. Indexing data structure requires $2^{33}$×(64 bits+49 bits+49 bits)≈168 GB, which is more than generally available SSD controller's RAM. In the described SSD controller, 1 GB controller RAM and 4 GB host memory buffer are reserved for key indexing structure.

The application of the disclosed embodiments to the described controller may release CPU computation resources, may simplify key-value records retrieval handling by firmware and may speed up record lookup.

In the described KV SSD, the configuration of the controller includes B+ tree node (branching factor 64), key size (64 bits) and NAND page ID (45 bits width). Therefore, B+ tree index includes four B+ tree node records mapping into and aligned with a 4 KB NAND page as shown in FIG. 11.

Figure 11:
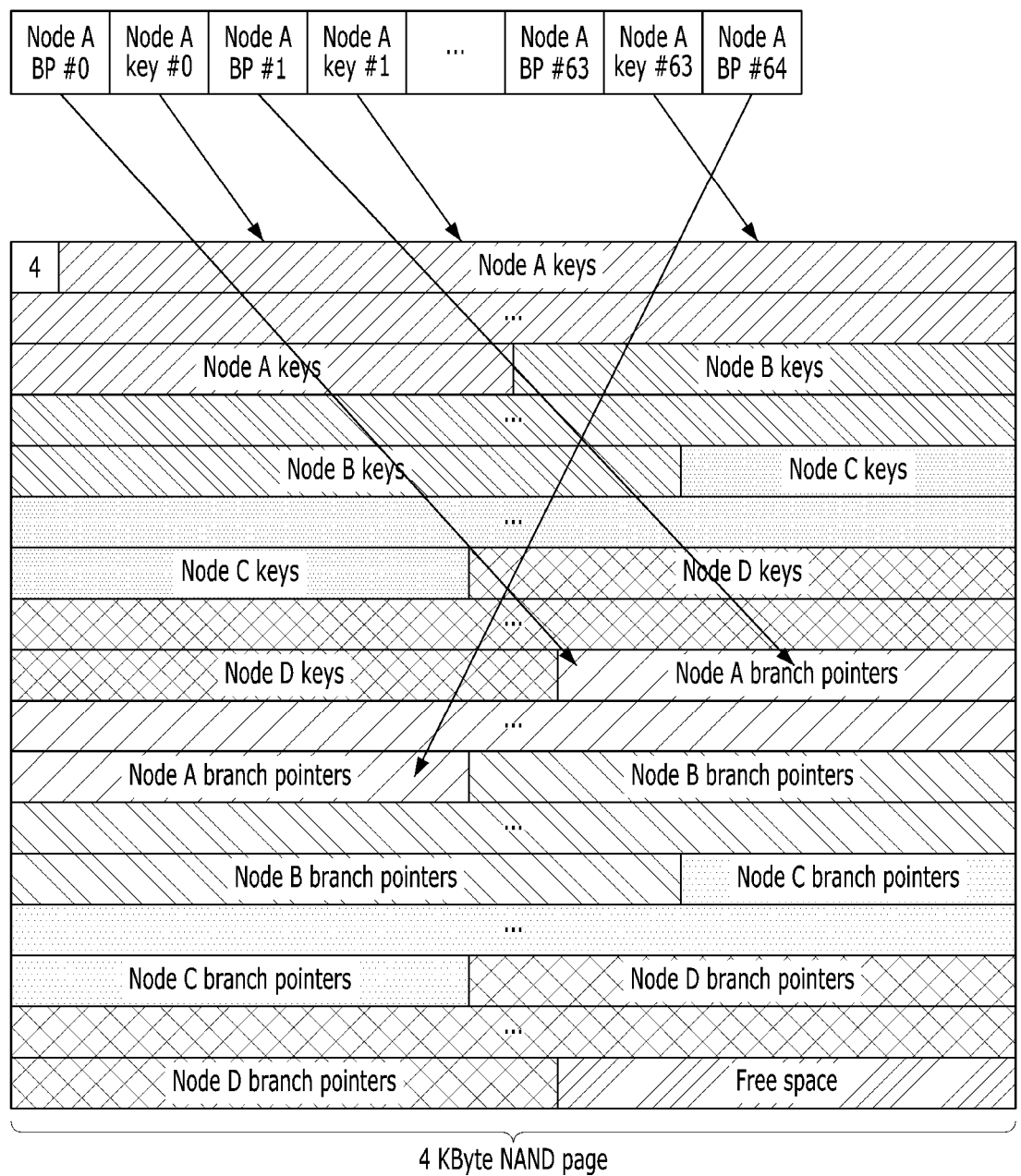
FIG. 11 is a diagram illustrating an example of mapping of B+ tree nodes into a page of a memory device in accordance with still another embodiment of the present invention.

Referring to FIG. 11, four B+ tree node records are mapped into a 4 KB NAND page. Four tree nodes include nodes A, B, C and D. Each node has 64 key values (i.e., Key #0~Key #63) and 65 branch pointers (i.e., BP #0~BP #64).

Example operations may be performed by the KTL 619 of FIG. 6B. KTL 619 may apply BPTKSA 612 to key-value records lookups.

Referring to FIGS. 6B and 8, KTL 619 may submit the searched key along with B+ tree NAND page identification (ID) to NBSKQ 802. In an embodiment, KTL 619 may receive the searched key along with B+ tree NAND page identification (ID) from the host 60. Since the searched key and NAND page ID have been submitted to NBSKQ 802, the key search process may be executed exclusively by BPTKSA 612, and the SSD controller's firmware may continue handling other tasks. The key lookup in B+ tree indexing data structure may be performed in accordance with the described B+ tree key search flow diagram of FIGS. 10A and 10B. Upon key search completion, key search result may be stored in KSRQ 801, and KTL 619 may be notified about state change of KSRQ 801. KTL 619 may pop the search result from KSRQ 801. Based on the search result, KTL 619 may retrieve record value matched with the searched key from the NAND.

Figure 12:
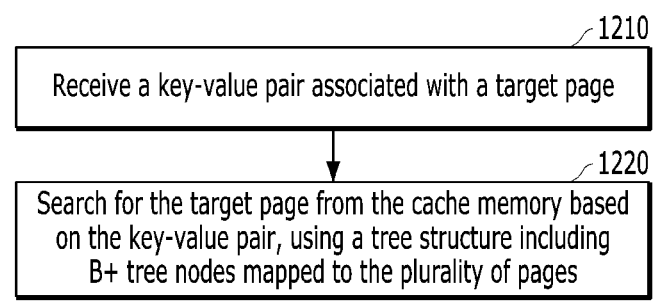
FIG. 12 is a flowchart illustrating a method for operating a memory system for searching for pages based on a B+ tree node structure in accordance with yet another embodiment of the present invention.

FIG. 12 is a flowchart illustrating a method for operating a memory system for searching for pages based on a B+ tree node structure in accordance with another embodiment of the present invention. The method of FIG. 12 may be performed by the memory system 600 including the search accelerator BPTKSA 612 shown in FIGS. 6A, 6B and 8.

Referring to FIG. 12, at operation 1210, the search accelerator 612 may receive a key-value pair associated with a target page among a plurality of pages of the memory device 620. At operation 1220, the search accelerator 612 may search for the target page from the controller memory (i.e., a cache memory) 614 based on the key-value pair, using a tree structure including B+ tree nodes mapped to the plurality of pages.

In one embodiment, the key-value pair may include a searched key and a value indicating a pointer to a tree node mapped to the target page, among the B+ tree nodes.

In another embodiment, the pointer may include page identification (ID) of the target page.

In still another embodiment, each of the plurality of pages may be aligned to multiple tree nodes among the B+ tree nodes.

In yet another embodiment, the multiple tree nodes may include a root node and lower-level nodes branching from the root node.

In one embodiment, the multiple tree nodes may have multiple keys and multiple branch pointers.

In another embodiment, the multiple keys may be sequentially mapped to a first region of a corresponding page, and the multiple branch pointers may be sequentially mapped to a second region of a corresponding page.

In still another embodiment, the search accelerator 612 may be coupled to the cache memory 614, and may be coupled to the memory device 620 through the flash translation layer 616.

In yet another embodiment, the search accelerator 612 may traverse the B+ tree nodes to search for the target page corresponding to the key-value pair from the cache memory 614.

In one embodiment, the search accelerator 612 may be coupled to a host buffer memory 62 of the host 60 through the host interface layer 618. When the target page is not searched from the cache memory 614, the search accelerator 612 may traverse the B+ tree nodes to search for the target page corresponding to the key-value pair from the host buffer memory 62.

In another embodiment, when the target page is not searched from the cache memory 614 and the host buffer memory 62, the search accelerator 612 may load the target page into the cache memory 614 from the memory device 620.

As described above, the disclosed embodiments provide a scheme for searching for pages of a memory device based on a B+ tree node structure. This scheme may reduce the number of NAND I/O operations required for B+ tree traversal.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives. Furthermore, the embodiments may be combined to form additional embodiments.

Indeed, implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A memory system comprising:
a memory device including a plurality of pages; and
a memory controller coupled to the memory device and including:
a cache memory;
a cache manager; and
a search accelerator configured to:
receive a key-value pair associated with a target page among the plurality of pages; and
search for the target page from the cache memory based on the key-value pair, using a tree structure including B+ tree nodes mapped to the plurality of pages,
wherein
the key-value pair includes a searched key and a value indicating a pointer to a tree node mapped to the target page, among the B+ tree nodes, and
the cache manager maintains pages, retrieved from the plurality of pages with lower-level B+ tree nodes, in the cache memory.

2. The memory system of claim 1, wherein the pointer includes a page identification (ID) of the target page.

3. The memory system of claim 1, wherein each of the plurality of pages corresponds to multiple tree nodes among the B+ tree nodes.

4. The memory system of claim 3, wherein the multiple tree nodes include a root node and lower-level nodes branching from the root node.

5. The memory system of claim 4, wherein the multiple tree nodes have multiple keys and multiple branch pointers.

6. The memory system of claim 5, wherein the multiple keys are sequentially mapped to a first region of a corresponding page, and the multiple branch pointers are sequentially mapped to a second region of a corresponding page.

7. The memory system of claim 1, wherein the search accelerator is coupled to the cache memory, and is coupled to the memory device through a flash translation layer.

8. The memory system of claim 7, wherein the search accelerator traverses the B+ tree nodes to search for the target page corresponding to the key-value pair from the cache memory.

9. The memory system of claim 8, wherein the search accelerator is coupled to a host buffer memory of a host through a host interface layer, and
wherein, when the target page is not searched from the cache memory, the search accelerator traverses the B+ tree nodes to search for the target page corresponding to the key-value pair from the host buffer memory.

10. The memory system of claim 8, wherein, when the target page is not searched from the cache memory and the host buffer memory, the search accelerator loads the target page into the cache memory from the memory device.

11. A method for operating a memory system including a memory device including a plurality of pages, and a memory controller including a cache memory and a cache manager, the method comprising:
receiving a key-value pair associated with a target page among the plurality of pages; and
searching for the target page from the cache memory based on the key-value pair, using a tree structure including B+ tree nodes mapped to the plurality of pages,
wherein
the key-value pair includes a searched key and a value indicating a pointer to a tree node mapped to the target page, among the B+ tree nodes, and the cache manager maintains pages, retrieved from the plurality of pages with lower-level B+ tree nodes, in the cache memory.

12. The method of claim 11, wherein the pointer includes a page identification (ID) of the target page.

13. The method of claim 11, wherein each of the plurality of pages corresponds to multiple tree nodes among the B+ tree nodes.

14. The method of claim 13, wherein the multiple tree nodes include a root node and lower-level nodes branching from the root node.

15. The method of claim 13, wherein the multiple tree nodes have multiple keys and multiple branch pointers.

16. The method of claim 15, wherein the multiple keys are sequentially mapped to a first region of a corresponding page, and the multiple branch pointers are sequentially mapped to a second region of a corresponding page.

17. The method of claim 11, wherein the searching for the target page comprises:
traversing the B+ tree nodes to search for the target page corresponding to the key-value pair from the cache memory.

18. The method of claim 17, wherein the searching for the target page comprises:
traversing, when the target page is not searched from the cache memory, the B+ tree nodes to search for the target page corresponding to the key-value pair from a host buffer memory of a host.

19. The method of claim 18, further comprising:
loading the target page into the cache memory from the memory device when the target page is not searched from the cache memory and the host buffer memory.

* * * * *